(12) United States Patent
Gomez et al.

(10) Patent No.: US 11,459,951 B2
(45) Date of Patent: Oct. 4, 2022

(54) ANTI-ICING SYSTEM WITH A FLOW-DEFLECTOR ASSEMBLY

(71) Applicant: General Electric Company, Schenectady, NY (US)

(72) Inventors: Francisco Gomez, Queretaro (MX); Laxmikant Merchant, Bangalore (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/131,280

(22) Filed: Dec. 22, 2020

(65) Prior Publication Data
US 2022/0195921 A1    Jun. 23, 2022

(51) Int. Cl.
| F02C 7/047 | (2006.01) |
| F02C 6/08  | (2006.01) |
| B64D 33/02 | (2006.01) |

(52) U.S. Cl.
CPC .............. *F02C 7/047* (2013.01); *F02C 6/08* (2013.01); *B64D 2033/0233* (2013.01); *F05D 2220/323* (2013.01); *F05D 2260/20* (2013.01)

(58) Field of Classification Search
CPC .... F02C 7/04; F02C 7/047; F02C 7/08; F02C 6/08; B64D 2033/0233; F05D 2220/323; F05D 2260/20
See application file for complete search history.

(56) References Cited

U.S. PATENT DOCUMENTS

| 5,166,479 A | 11/1992 | Gras et al. |
| 5,560,195 A * | 10/1996 | Anderson ................. F02C 7/04 60/785 |
| 8,272,222 B2 | 9/2012 | Zhang et al. |
| 9,771,865 B2 | 9/2017 | Merchant et al. |
| 9,890,713 B2 | 2/2018 | Zhang et al. |
| 10,022,660 B2 | 7/2018 | Santini et al. |
| 10,663,170 B2 | 5/2020 | Abu-Irshaid et al. |
| 2004/0256174 A1 | 12/2004 | Friou |
| 2010/0232945 A1 | 9/2010 | Zhang et al. |

(Continued)

FOREIGN PATENT DOCUMENTS

| DE | 4009552 A1 | 9/1991 |
| EP | 1461513 B1 | 8/2006 |

OTHER PUBLICATIONS

U.S. Appl. No. 17/131,301, filed Dec. 22, 2020, Francisco Gomez.

(Continued)

*Primary Examiner* — Steven M Sutherland
(74) *Attorney, Agent, or Firm* — Fletcher Yoder, P.C.

(57) ABSTRACT

An anti-icing system for a gas turbine system includes multiple nozzles, wherein each nozzle of the multiple nozzles includes one or more outlets that are configured to inject a heated fluid into an airflow within an air intake conduit. The anti-icing system also includes multiple plates disposed upstream of the one or more outlets, wherein each plate of the multiple plates extends laterally across the air intake conduit and is vertically spaced apart from one or more adjacent plates to define one or more vertically-extending gaps. The multiple plates are configured to direct the airflow through the one or more vertically-extending gaps to spread the airflow upstream of the one or more outlets to facilitate mixing of the heated fluid and the airflow.

20 Claims, 6 Drawing Sheets

(56) References Cited

U.S. PATENT DOCUMENTS

| | | |
|---|---|---|
| 2011/0162383 A1* | 7/2011 | Zhang ................ F02K 1/36 |
| | | 415/119 |
| 2015/0068217 A1 | 3/2015 | Merchant et al. |
| 2017/0234220 A1 | 8/2017 | Saraswathi et al. |
| 2017/0234239 A1 | 8/2017 | Saraswathi et al. |
| 2018/0272167 A1 | 9/2018 | Ahmadzadegan et al. |
| 2018/0274445 A1 | 9/2018 | Sankarakumar et al. |
| 2019/0003387 A1 | 1/2019 | Ponyavin et al. |

OTHER PUBLICATIONS

U.S. Appl. No. 16/745,312, filed Jan. 16, 2020, Rajesh Prabhakaran Saraswathi.

European Search Report for EP Application No. 21214629.4, dated May 12, 2022, 7 pgs.

European Search Report for EP Application No. 21214625.2, dated May 11, 2022, 6 pgs.

\* cited by examiner

ANTI-ICING SYSTEM WITH A FLOW-DEFLECTOR ASSEMBLY

BACKGROUND

The subject matter disclosed herein relates to an anti-icing system for a gas turbine system.

In general, a gas turbine system combusts a mixture of compressed air and fuel to produce hot combustion gases. More particularly, the gas turbine system includes a compressor that compresses air to generate the compressed air. The gas turbine system also includes a combustor that mixes the compressed air and the fuel to produce combustion gases. The combustion gases are directed into a turbine to drive rotation of turbine blades and a shaft that is coupled to the turbine blades. The rotation of the shaft may drive a load, such as an electrical generator that is coupled to the shaft.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the claimed subject matter. Indeed, the claimed subject matter may encompass a variety of forms that may be similar to or different from the embodiments set forth below.

In one embodiment, an anti-icing system for a gas turbine system includes multiple nozzles, wherein each nozzle of the multiple nozzles includes one or more outlets that are configured to inject a heated fluid into an airflow within an air intake conduit. The anti-icing system also includes multiple plates disposed upstream of the one or more outlets, wherein each plate of the multiple plates extends laterally across the air intake conduit and is vertically spaced apart from one or more adjacent plates to define one or more vertically-extending gaps. The multiple plates are configured to direct the airflow through the one or more vertically-extending gaps to spread the airflow upstream of the one or more outlets to facilitate mixing of the heated fluid and the airflow.

In one embodiment, a gas turbine system includes a turbine, a combustor, and a compressor coupled to an air intake system. The air intake system is configured to supply a heated airflow to the compressor, and the air intake system includes a filter system and an anti-icing system. The anti-icing system includes multiple nozzles, wherein each nozzle of the multiples nozzles includes one or more outlets that are configured to inject a heated fluid into an airflow. The anti-icing system also includes multiple plates disposed upstream of the one or more outlets, wherein a first plate of the multiple plates has a first cross-sectional shape and a second plate of the plurality of plates has a second cross-sectional shape to facilitate mixing of the heated fluid and the airflow upstream of the filter system.

In one embodiment, a method includes injecting a heated fluid through multiple outlets of multiple nozzles into an airflow along an airflow path upstream of a filter of a gas turbine system. The method also includes spreading the airflow upstream of the multiple outlets via multiple plates positioned upstream of the multiple outlets to facilitate mixing of the heated fluid and the airflow to thereby block ice formation on the filter of the gas turbine system, wherein spreading the airflow upstream of the multiple outlets via the multiple plates includes spreading a first portion of the airflow via a first plate of the multiple plates and a second portion of the airflow via a second plate of the multiple plates, and the first plate and the second plate have different cross-sectional shapes

BRIEF DESCRIPTION OF THE DRAWINGS

These and other features, aspects, and advantages of the present anti-icing system and method will become better understood when the following detailed description is read with reference to the accompanying drawings in which like characters represent like parts throughout the drawings, wherein.

DETAILED DESCRIPTION

Figure 1:
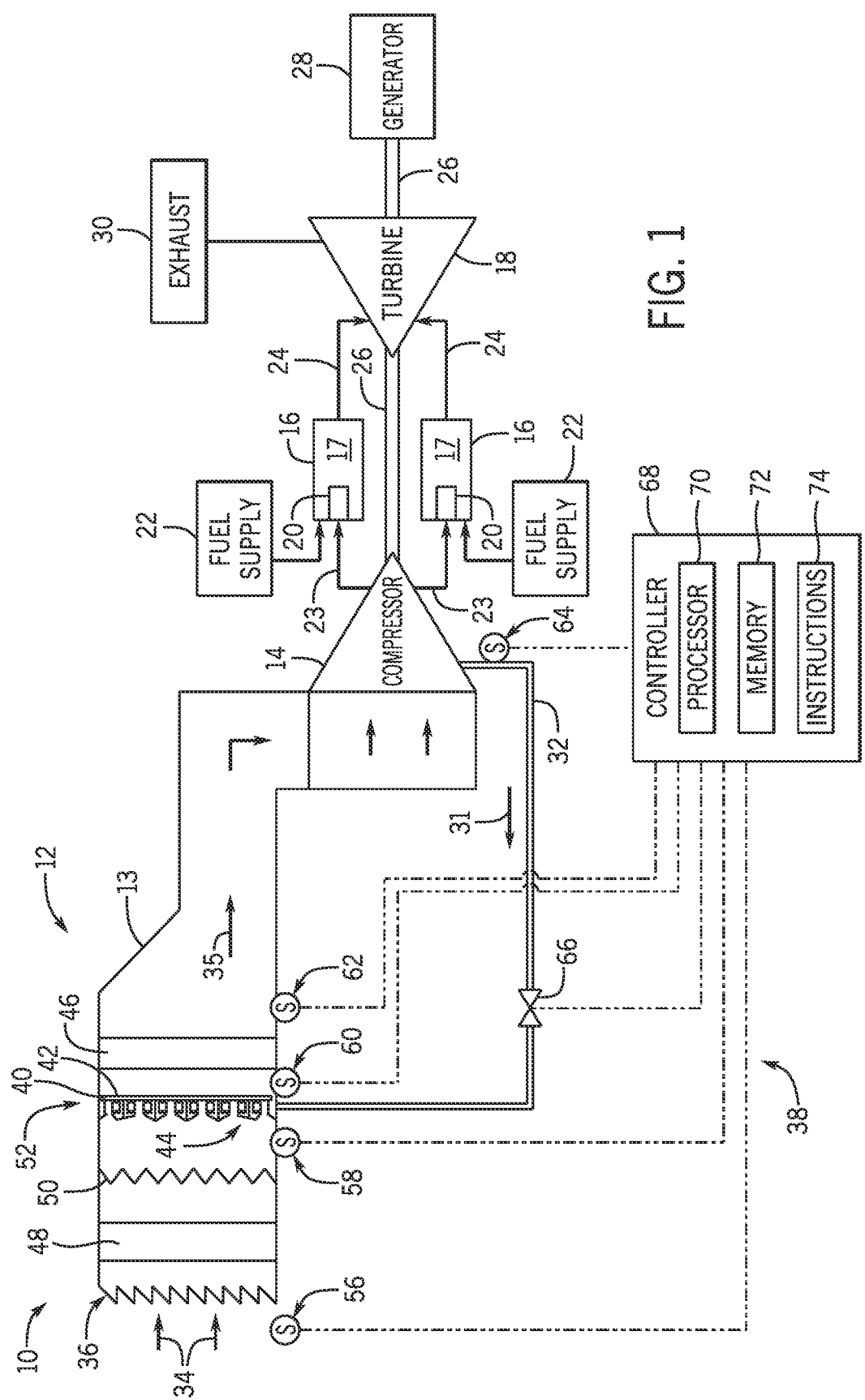
FIG. 1 is a block diagram of a gas turbine system having an air intake system, in accordance with an embodiment.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

A gas turbine system receives an airflow (e.g., ambient airflow) through an air intake system, which directs the airflow to a compressor of the gas turbine system. The disclosed embodiments relate to an anti-icing system that is configured to block a buildup of ice on a filter within the air intake system. The anti-icing system includes nozzles that are configured to spray a heated fluid (e.g., compressor discharge air) to mix with the airflow in order to form a heated airflow that increases a temperature adjacent to the filter within the air intake system and that blocks the buildup of ice on the filter within the air intake system. The anti-icing system also includes a flow-deflector assembly with multiple plates (e.g., baffles) that are positioned to distribute (e.g., spread, disperse) the airflow upstream of the nozzles to thereby increase the mixing of the airflow and the heated fluid within the air intake system. In this way, even in inclement conditions (e.g., cold and/or high relative humidity ambient conditions), the temperature of the heated airflow that flows through the filter within the air intake system may be maintained within desirable limits across a face of the filter (e.g., across all or most of the face of the filter) to enable proper operation of the air intake system and to provide satisfactory performance of the gas turbine system.

While the anti-icing system is generally described as being used to mix the airflow and the heated fluid to increase the temperature of the airflow (e.g., to turn the airflow into the heated airflow for anti-icing functionality) during cold ambient conditions to facilitate discussion, it should be appreciated that the anti-icing system may be more generally referred to as an inlet bleed heat (IBH) system and may also advantageously mix the airflow and the heated fluid in a manner that blocks extremely high temperatures (e.g., hot spots that exceed a high temperature limit for the filter) at the filter of the air intake system during other conditions (e.g., hot ambient conditions and/or IBH maximum flow conditions). Thus, the anti-icing system may also protect the filter from the extremely high temperatures that may otherwise result in early degradation of material of the filter and/or damage (e.g., burn) the material of the filter.

For example, the anti-icing system may mix the airflow and the heated fluid such that at least 50 percent (or at least 55, 60, 70, 80, 90, or 95 percent) of the face of the filter is heated by the heated airflow having a respective temperature that is at least 2 degrees Celsius (or at least 3, 4, or 5 degrees Celsius) greater than an ambient temperature (e.g., the temperature of the airflow upon entry into the air intake system; during cold ambient conditions), and the anti-icing system may also mix the airflow and the heated fluid such that less than 50 percent (or less than 40, 30, 20, 10, or 5 percent) of the face of the filter is heated to the extremely high temperatures (e.g., hot spots of more than 90 degrees Celsius extend across less than 50 percent of the filter face of the filter or are completely eliminated, even when the heated fluid that mixes with the airflow has a respective temperature that is greater than 400 degrees Celsius; during hot ambient conditions and/or IBH maximum flow conditions).

Furthermore, the anti-icing system generally provides better mixing, which provides a positive impact on the compressor by reducing thermal distortion of the heated airflow at an inlet of the compressor. It should be appreciated that the anti-icing system disclosed herein may be used in additional operating conditions, such as at non-icing temperatures and gas turbine base load with the anti-icing system inactivated (e.g., turned off). In such cases, the structural components of the anti-icing system (e.g., flow deflectors) may generate pressure loss that is not increased significantly due to the presence of the structural components (e.g., as compared to systems without the structural components).

Turning now to the drawings, FIG. 1 is a block diagram of an embodiment of a gas turbine system 10 (e.g., gas turbine engine). The gas turbine system 10 includes an air intake system 12 having an air intake conduit 13 (e.g., housing). The gas turbine system 10 also includes a compressor 14, one or more combustors 16, and a turbine 18. The gas turbine system 10 intakes an airflow 34 (e.g., ambient air) into the air intake system 12, mixes the airflow 34 with a heated fluid within the air intake system 12 to form a heated airflow 35, compresses the heated airflow 35 through the compressor 14 to form a compressed airflow 23, and combusts a fuel with the compressed airflow 23 in the one or more combustors 16. Each combustor 16 has one or more fuel nozzles 20 configured to inject a liquid fuel and/or a gaseous fuel (e.g., natural gas or syngas) from one or more fuel supplies 22 into a combustion chamber 17. Although not shown, in some embodiments, the fuel nozzles 20 may include primary and secondary fuel nozzles that inject fuel at a primary fuel injection zone and a secondary fuel injection zone, respectively.

Each combustor 16 combusts the fuel injected by the fuel nozzles 20 with the compressed airflow 23 to create hot, pressurized combustion gases 24 (e.g., exhaust gas), which is then directed into the turbine 18. The turbine 18 has turbine blades coupled to a shaft 26, which is coupled to a load such as an electric generator 28. As the combustion gases 24 flow into and through the turbine 18, the combustion gases 24 drive rotation of the turbine blades and the shaft 26, thereby driving the electric generator 28. In some embodiments, the shaft 26 may be connected to another load, such as machinery, a propeller of an aircraft or ship, or a compressor. Eventually, the combustion gases 24 exit the gas turbine system 10 via an exhaust section 30 (e.g., an exhaust diffuser, an exhaust duct, an exhaust stack or tower, an emissions control system such as a selective catalytic reduction (SCR) system, etc.). In the illustrated embodiment, the shaft 26 is coupled to a compressor shaft of the compressor 14, which has compressor blades coupled to the compressor shaft in one or more stages (e.g., 1 to 30 stages in different axial positions). The rotation of the compressor blades within the compressor 14 causes compression of the airflow 34 from the air intake system 12.

Furthermore, the gas turbine system 10 also extracts or bleeds a portion of the compressed airflow (e.g., the heated fluid or a heated fluid flow, as indicated by arrow 31) from the compressor 14 through an extraction or bleed conduit 32 to an anti-icing system 38 (e.g., an inlet bleed heat [IBH] system). In particular, the anti-icing system 38 includes multiple nozzles 40 (e.g., anti-icing nozzles; inlet bleed heat [IBH] nozzles), a manifold 42 (e.g., an inlet bleed heat [IBH] manifold), and a flow-deflector assembly 44. The heated fluid from the bleed conduit 32 is provided into the manifold 42, which delivers the heated fluid to the multiple nozzles 40, which spray the heated fluid into the airflow 34 to form the heated airflow 35. As discussed in more detail below, the flow-deflector assembly 44 includes multiple plates (e.g., flow shields, diverters, baffles) that are configured to distribute (e.g., spread, disperse) the airflow 34 to facilitate mixing the airflow 34 with the heated fluid from the nozzles 40 upstream of a filter 46 of the air intake system 12. Thus, the flow-deflector assembly 44 operates to block a buildup of ice on the filter 46 and/or to generally maintain the heated airflow 35 at a temperature that is within desirable limits across a face of the filter 46 (e.g., across all or most of the face of the filter 46) to enable proper operation of the air intake system 12 and to provide satisfactory performance of the gas turbine system 10.

The bleed conduit 32 may be one or more bleed conduits that are coupled to the compressor 14 at or downstream from each, some, or one of the one or more compressor stages. The compressor 14 increases the pressure and temperature of the compressed airflow 23 with each subsequent compressor stage, and thus the bleed conduit 32 may extract the compressed airflow 23 at a particular compressor stage with a suitable pressure and temperature for use in the anti-icing system 38. In certain embodiments, the anti-icing system 38 may selectively extract the compressed airflow 23 (e.g., as the heated fluid, as indicated by arrow 31) through the bleed conduit 32 based on a temperature (e.g., monitored by one or more sensors, S) of the airflow 34 entering the air intake system 12, a temperature of the heated airflow 35 at the filter 46, and/or a temperature of the heated airflow 35 at the compressor 14. For example, with a progressively lower ambient temperature, the anti-icing system 38 may extract the compressed airflow through a greater number of bleed conduits 32 and/or through bleed conduits 32 at progressively later compressor stages of the compressor 14.

In operation, the air intake system 12 receives the airflow 34 through an air hood 36 coupled to the air intake conduit 13. In some embodiments, the airflow 34 may pass through or across one or more additional air intake components, such as multiple silencer baffles 48, one or more coalescers 50, the nozzles 40, the manifold 42, the flow-deflector assembly 44, and the filter 46. Together, the nozzles 40, the manifold 42, and the flow-deflector assembly 44 may be considered an anti-icing assembly 52 (e.g., inlet bleed heat [IBH] assembly).

As noted above, the anti-icing system 38 also includes multiple sensors S that are configured to monitor operational conditions, such as the temperature, humidity, or various conditions conducive to ice formation. For example, the anti-icing system 38 may include one or more sensors 56 positioned at or outside of the air hood 36 to thereby monitor ambient conditions of the air (e.g., ambient temperature, humidity, etc.) The anti-icing system 38 may include one or more sensors 58 positioned at or upstream of the manifold 42, such as between the manifold 42 and the air hood 36. The anti-icing system 38 also may include one or more sensors 60 positioned at or downstream from the manifold 42, such as at the filter 46 or between the manifold 42 and the filter 46. Furthermore, the anti-icing system 38 may include one or more sensors 62 positioned downstream of the filter 46, such as at or upstream of the intake of the compressor 14. The anti-icing system 38 also may include one or more sensors 64 disposed along each of the bleed conduits 32.

The anti-icing system 38 also includes a controller 68 communicatively coupled to the sensors 56, 58, 60, 62, and 64, a valve 66 disposed along each bleed conduit 32, and various components of the gas turbine system 10 (e.g., valves that control a supply of the fuel from the fuel supply 22 to the fuel nozzles 20). The controller 58 has a processor 70, a memory 72, and computer-readable instructions 74 stored on the memory 72 and executable by the processor 70. The controller 68 obtains sensor readings from the sensors S, and the controller 68 may use the computer-readable instructions 74 to regulate the operation of the anti-icing system 38 based on these sensor readings, upper and lower thresholds for temperature (e.g., desirable limits or targets), computer models, and/or user input. For example, if the temperature at one or more of the sensors falls below a lower temperature threshold (e.g., 0 degrees Celsius), then the controller 68 may send a control signal to an actuator (e.g., an electric actuator) of the valve 66 to partially or entirely open the valve 66 to enable a flow of the heated fluid to pass through the bleed conduit 32 to the manifold 42. Although FIG. 1 illustrates the compressed airflow from the compressor 14 as the heated fluid supplied to the manifold 42, certain embodiments of the anti-icing system 38 may be additionally or alternatively coupled to one or more other sources of heated fluid (e.g., other sources of heated airflow, exhaust gas).

In this way, the controller 68 may monitor the anti-icing system 38 and control the flowrate and/or the temperature of the heated fluid into the manifold 42 and through the nozzles 40 into the air intake conduit 13, thereby adjusting the temperature in the air intake conduit 13 to inhibit and/or remove ice formation on the filter 46 or elsewhere in the air intake system 12 and/or in the compressor 14. As discussed in more detail below, the flow-deflector assembly 44 distributes the airflow 34 to facilitate mixing between the airflow 34 and the heated fluid ejected by the nozzles 40 to thereby adjust the temperature of the heated airflow 35 and/or to make the temperature of the heated airflow 35 more uniform within a region of the air intake conduit 13 downstream of the anti-icing assembly 52 (e.g., between the anti-icing assembly 52 and the filter 46, and particularly across a face of the filter 46).

Figure 2:
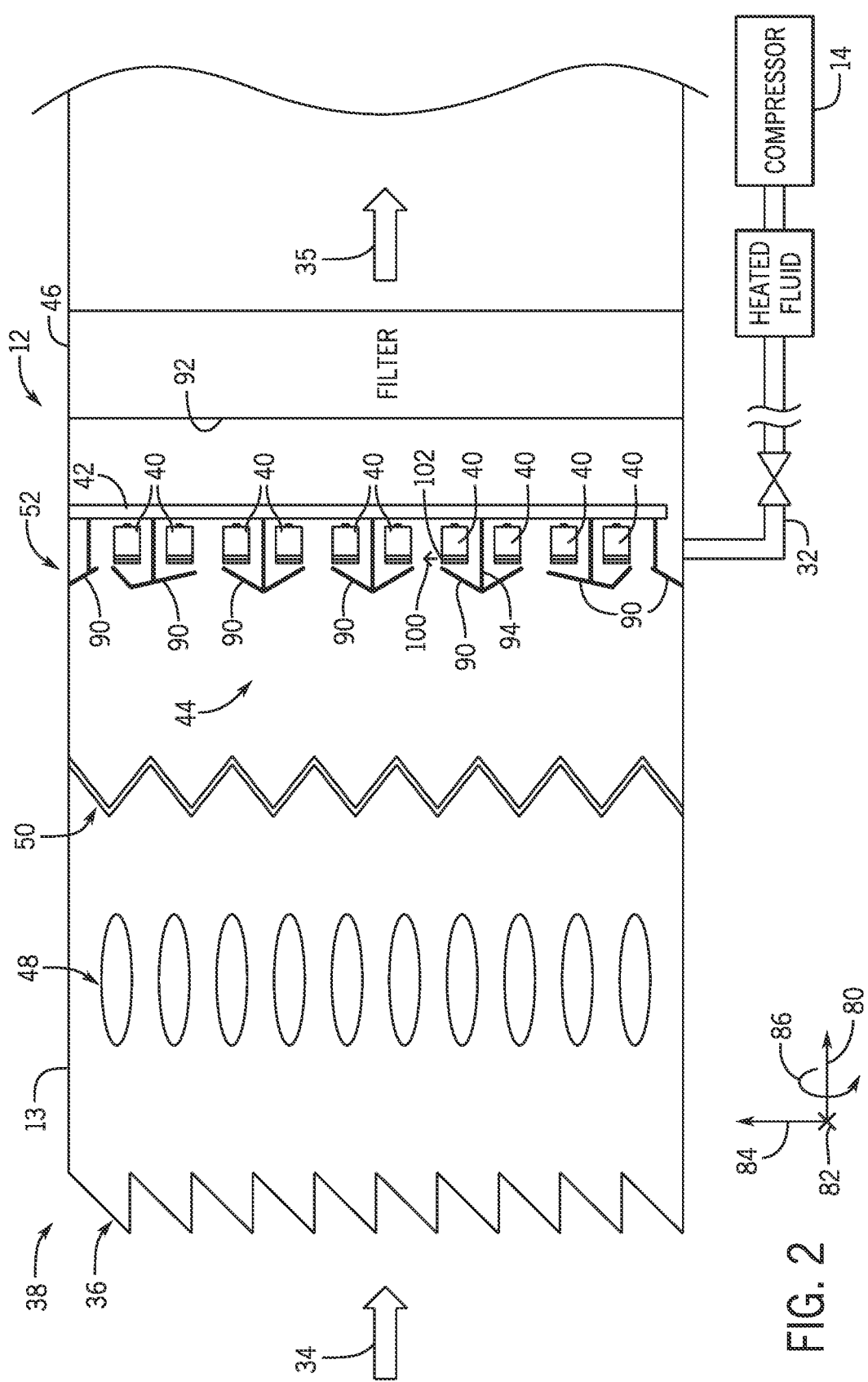
FIG. 2 is a schematic of a portion of an anti-icing system that may be used in the air intake system of FIG. 1, in accordance with an embodiment.

FIG. 2 is a schematic of an embodiment of the anti-icing system 38 coupled to the air intake system 12. To facilitate discussion, the anti-icing system 38 and the air intake system 12 may be described with reference to a longitudinal axis or direction 80, a lateral axis or direction 82, a vertical axis or direction 84, and/or a circumferential axis or direction 86.

As shown, the anti-icing system 38 includes the anti-icing assembly 52 having the nozzles 40, the manifold 42, and the flow-deflector assembly 44. The airflow 34 enters the air intake system 12 through the air hood 36, which may include multiple angled baffles to block entry of rain or snow. The airflow 34 may also pass through multiple silencer baffles 48 and/or coalescers 50 upstream of the anti-icing assembly 52. The silencer baffles 48 have one or more acoustic attenuation features (e.g., acoustic attenuation surface features, internal material) to help reduce acoustic noise caused by the airflow 34 passing through the air intake system 12. The coalescers 50 are configured to remove water from the airflow 34. The coalescers 50 may include mechanical coalescers, electrostatic coalescers, or a combination thereof.

After the airflow 34 mixes with the heated fluid to form the heated airflow 35, the heated airflow 35 may then pass through the filter 46. The filter 46 may include any number and type of filters. The filter 46 may be configured to filter particulate and moisture; however, the filter 46 may be susceptible to ice formation at certain low temperatures and/or heat damage at certain high temperatures. Although the above components are illustrated in a sequence (e.g., upstream to downstream) in the air intake conduit 13, various embodiments may rearrange each of the foregoing components in any suitable order, except that the anti-icing assembly 52 remains upstream from the filter 46.

As shown, the flow-deflector assembly 44 includes multiple plates 90 that are configured to distribute the airflow 34 across a cross-sectional area of the air intake conduit 13 to facilitate mixing with the heated fluid output by the nozzles 40. The mixing of the airflow 34 and the heated fluid forms the heated airflow 35 and provides a more uniform, desirable temperature of the heated airflow 35 at a face 92 (e.g., longitudinally-facing surface; upstream surface) of the filter 46 to thereby block the buildup of ice at the filter 46 and/or in other regions of the air intake system 12.

The nozzles 40 are arranged along the lateral axis 82 and the vertical axis 84 (e.g., spaced apart in a grid-like pattern). In the illustrated embodiment, each nozzle 40 is coupled to the manifold 42 on an upstream side of the manifold 42, such that the manifold 42 is positioned between the nozzle 40 and the filter 46 along the longitudinal axis 80. However, it should be appreciated that each nozzle 40 may be coupled to the manifold 42 on a downstream side of the manifold 42, such that the nozzle 40 is positioned between the manifold 42 and the filter 46 along the longitudinal axis 80. In any case, regardless of the relative positioning of the nozzles 40 and the manifold 42, the plates 90 of the flow-deflector assembly 44 are positioned on an upstream side of the nozzles 40, such that the nozzles 40 are positioned between the plates 90 and the filter 46 along the longitudinal axis 80. The plates 90 are generally stacked along the vertical axis 84 and are spaced apart from one another along the vertical axis 84, and each of the plates 90 generally extends along the lateral axis 82. The plates 90 operate to direct and/or to guide the airflow 34 through gaps 96 (e.g., vertically-extending gaps) between the plates 90. It should be appreciated that the plates 90 may be supported via one or more brackets 94, which may extend between and couple the plates 90 to the manifold 42 or to any other suitable structure within the air intake system 12 to position the plates 90 adjacent to and/or upstream of the nozzles 40.

Each nozzle 40 includes one or more outlets 102. The outlets 102 may have any suitable form. For example, the outlets 102 may include one or more continuous rings that extend circumferentially about the nozzle 40 (as shown), or the outlets 102 may be discrete openings spaced circumferentially about the nozzle 40. The outlets 102 may also be positioned at any suitable location between a first, upstream end of the nozzle 40 and a second, downstream end of the nozzle 40 (e.g., any suitable location along the longitudinal axis 80). For example, the outlets 102 may be positioned proximate to the first, upstream end (e.g., closer to the first, upstream end) to position the outlets 102 closer to the plates 90 and to provide more space (e.g., distance along the longitudinal axis 80; as compared to being positioned proximate to the second, downstream end) for mixing of the airflow 34 and the heated fluid upstream of the filter 46. It should be appreciated that the placement of the nozzles 40 on the upstream side of the manifold 42 also provides more space (e.g., distance along the longitudinal axis 80; as compared to each nozzle 40 being coupled to the manifold on the downstream side of the manifold 42) for mixing the airflow 34 and the heated fluid upstream of the filter 46. Thus, the components of the anti-icing assembly 52 may be arranged to provide an efficient anti-icing process within a given size of the air intake conduit 13 (e.g., that has limited space within the air intake conduit 13; retrofitted) and/or may enable use of a smaller size air intake conduit 13 (e.g., as compared to air intake conduits that are devoid of the anti-icing assembly 52).

Regardless of their form and/or position, the outlets 102 may inject (e.g., spray) the heated fluid radially-outwardly from the nozzle 40 and/or cross-wise to the airflow 34, as represented by arrow 100. The plates 90 of the flow-deflector assembly 44 direct the airflow 34 into the heated fluid, thereby facilitating mixing of the airflow 34 and the injected flows of the heated fluid. In particular, the plates 90 direct the airflow 34 in a crosswise direction relative to the longitudinal axis 80, thereby providing a low velocity recirculation region downstream of the plates 90 and adjacent the outlets 102 for improved penetration of the injected flows of the heated fluid into the airflow 34. Thus, the plates 90 may improve the anti-icing capability of the anti-icing system 38, block formation of cold spots that could otherwise experience ice formation, block formation of hot spots that could otherwise damage the filter 46, enable use of a smaller number of nozzles 40 with a greater spacing between adjacent nozzles 40, and/or enable use of a smaller size air intake conduit 13.

In the illustrated embodiment, the heated fluid includes the compressed airflow extracted from the compressor 14, as discussed above with reference to FIG. 1. The compressed air from the compressor 14 may be approximately 200 to 600 degrees Celsius, having approximate pressures of 800 to 900 Kilopascals. However, the anti-icing system 38 may directly or indirectly use any one or more heated fluids to elevate the temperature of the airflow 34. For example, as illustrated, the heated fluid may be any suitable heated fluid that can be directly injected into the airflow 34 through the nozzles 40 to elevate the temperature of the airflow 34, including, but not limited to, a heated air or exhaust gas.

Figure 3:
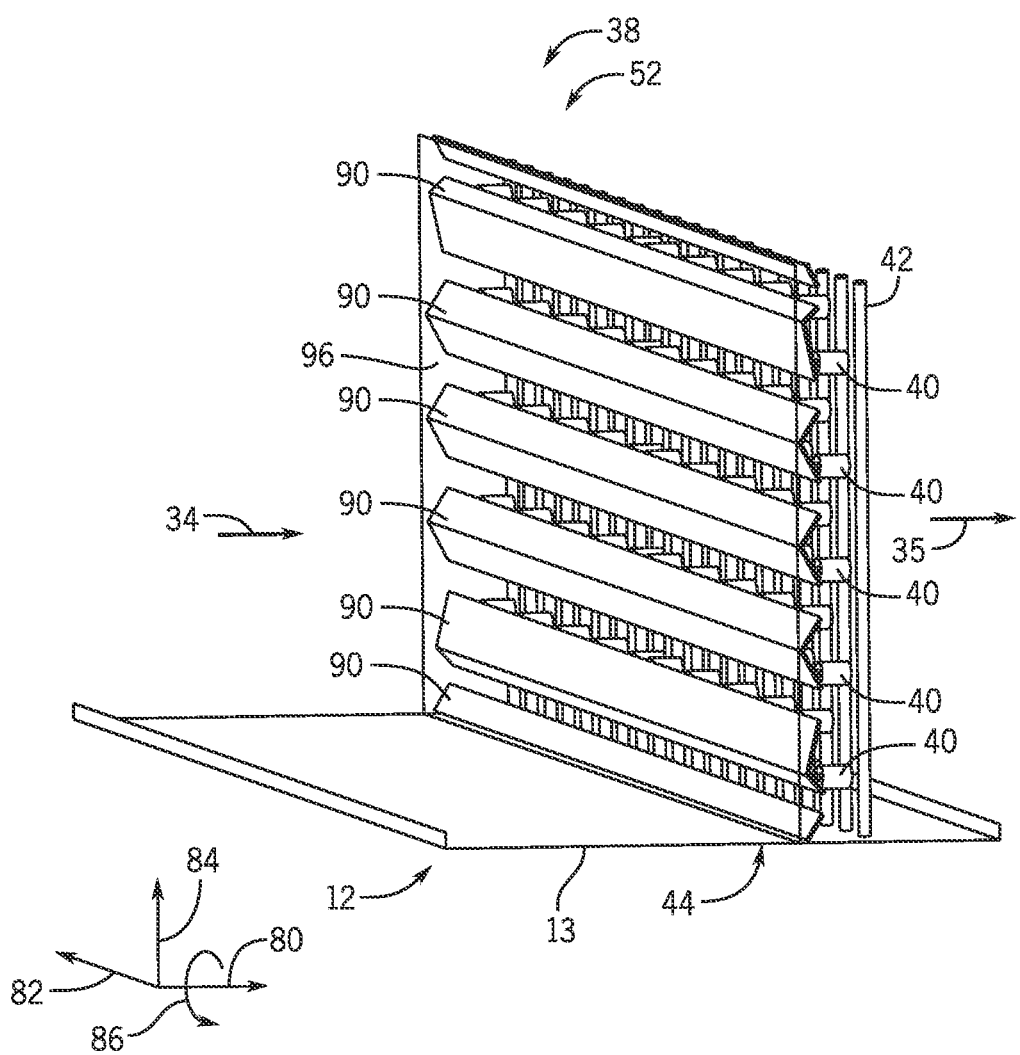
FIG. 3 is a perspective view of an anti-icing assembly of the anti-icing system of FIG. 2, in accordance with an embodiment.

FIG. 3 is a perspective view of an embodiment of the anti-icing assembly 52 of the anti-icing system 38 within a portion of the air intake conduit 13 of the air intake system 12. As shown, the anti-icing assembly 52 includes the nozzles 40, the manifold 42, and the flow-deflector assembly 44 with the plates 90. The nozzles 40 are arranged in a grid-like pattern (e.g., two-dimensional grid), and the nozzles 40 are mounted on and/or are fluidly coupled to various conduits of the manifold 42. The plates 90 may also be mounted on (e.g., via the brackets 94 of FIG. 2; the brackets 94 are omitted in other drawings for image clarity) the manifold 42. As shown, the plates 90 are generally spaced apart from one another along the vertical axis 84, and each of the plates 90 generally extends along the lateral axis 82. The plates 90 operate to direct and/or to guide the airflow 34 through the gaps 96 (e.g., vertically-extending gaps) between the plates 90. The airflow 34 may contact and may be diverted by the plates 90 to facilitate mixing between the airflow 34 and the heated fluid sprayed radially outwardly from the nozzles 40. The airflow 34 and the heated fluid may mix to form the heated airflow 35.

Figure 4:
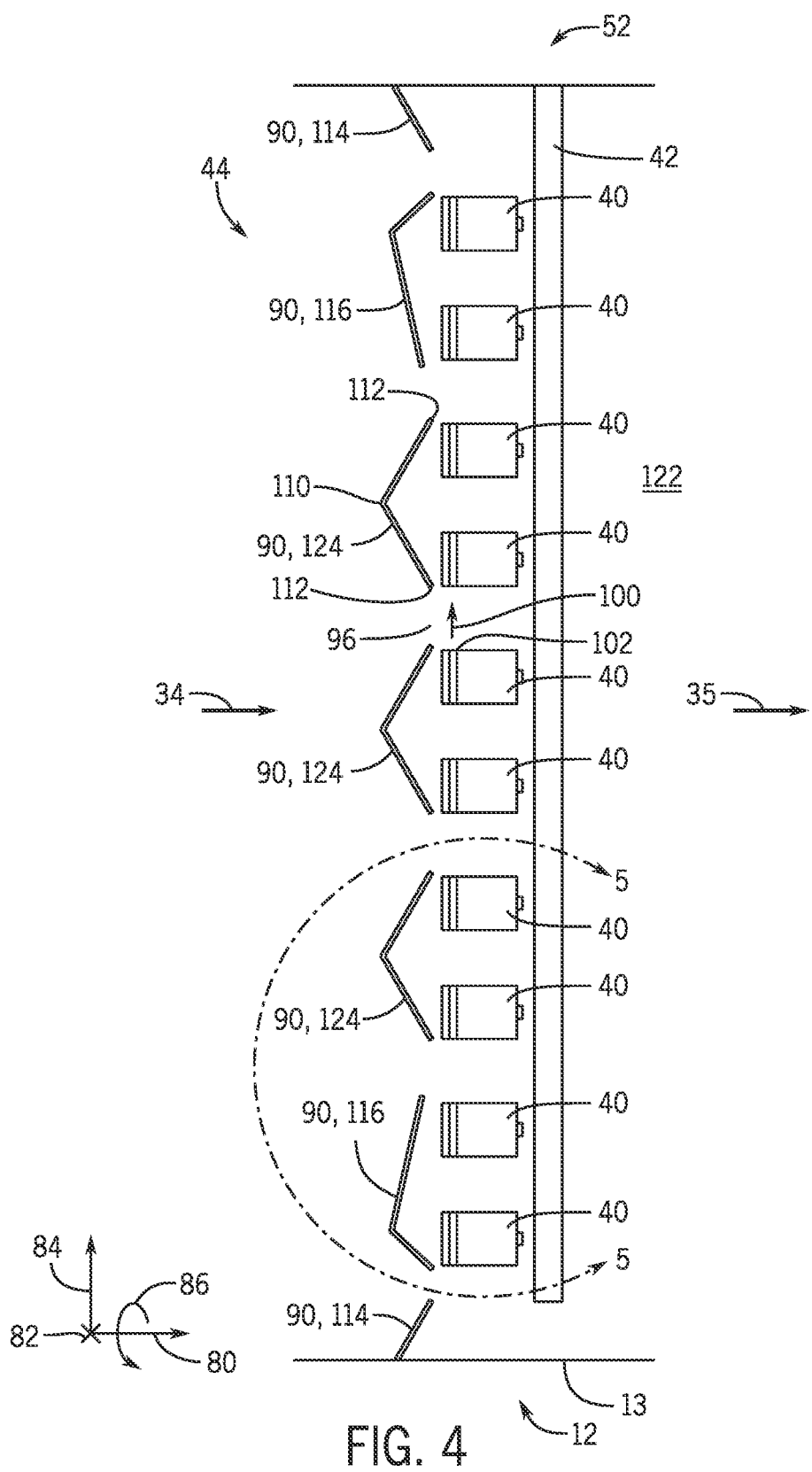
FIG. 4 is a side view of the anti-icing assembly of FIG. 3, in accordance with an embodiment.
Figure 5:
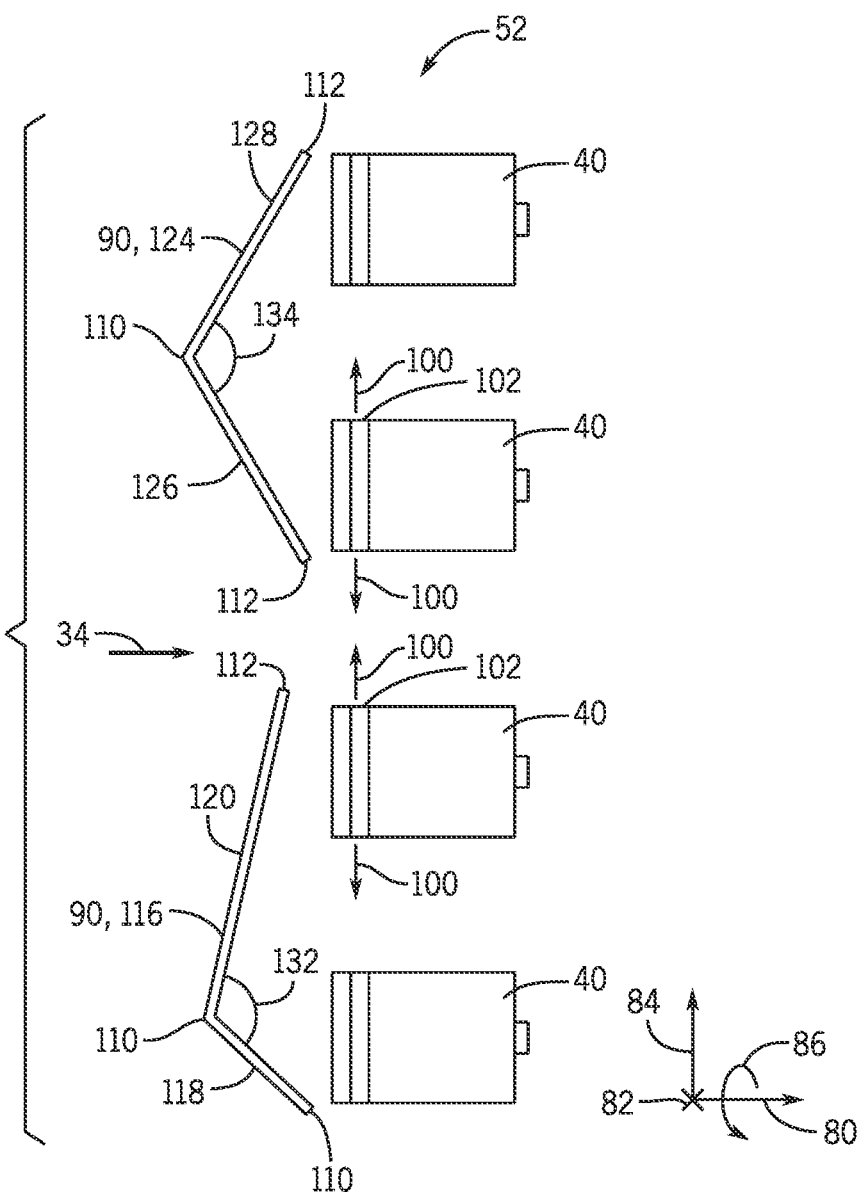
FIG. 5 is a side view of a portion of the anti-icing assembly of FIG. 3, in accordance with an embodiment.

FIG. 4 is a side view of an embodiment of the anti-icing assembly 52, and FIG. 5 is a side view of a portion of the embodiment of the anti-icing assembly 52 of FIG. 4 taken within line 5-5 (with the manifold 42 excluded for image clarity). As shown, the anti-icing assembly 52 includes the nozzles 40, the manifold 42, and the flow-deflector assembly 44 with the plates 90. In the illustrated embodiment, each nozzle 40 is positioned on an upstream side of the manifold 42, such that the nozzles 40 are positioned between the plates 90 and the manifold 42 along the longitudinal axis 80. The plates 90 are provided on an upstream side of the nozzles 40 to facilitate mixing between the airflow 34 and the heated fluid that is sprayed radially-outwardly from the nozzles 40 via the outlets 102 (e.g., as shown by the arrows 100).

In the illustrated embodiment, at least some of the plates 90 have a v-shape cross-sectional shape with an apex 110 positioned upstream of ends 112. In some embodiments, each of the ends 112 is positioned adjacent to and/or is substantially aligned with (e.g., along the vertical axis 84) a radially-outer wall of the nozzle 40 (e.g., with the outlets 102 of the nozzle 40) to facilitate mixing between the airflow 34 and the heated fluid.

As shown, the plates 90 may have different cross-sectional shapes compared to one another. For example, outermost plates 90, 114 positioned adjacent to a wall of the air intake conduit 13 may not have the v-shape cross-sectional shape, but instead may be a linear plate that is tapered or angled (e.g., an outer-most end is upstream from an inner-most end) to direct the airflow 34 away from the wall of the air intake conduit 13 and toward the nozzles 40. In some embodiments, intermediate plates 90, 116 may have an off-center v-shape cross-sectional shape (e.g., asymmetrical about a center line through the apex 112) in which a first section 118 (e.g., outer section) is shorter than a second section 120 (e.g., inner section) to direct a greater portion of the airflow 34 that contacts each of the intermediate plates 90, 116 toward a center region 122 (e.g., along a center line or axis) within the air intake conduit 13 and to direct a smaller portion of the airflow 34 that contacts each of the intermediate plates 90, 116 toward the walls of the air intake conduit 13 (e.g., toward an outer region within the air intake conduit 13; below or above all of the nozzles 40). In some embodiments, a respective length (e.g., from the apex 110 to the end 112) of the first section 118 may be between about 20 to 80, 30 to 60, or 35 to 45 percent of the respective length of the second section 120. In some embodiments, the respective length of the first section 118 may be about 40 percent of the respective length of the second section 120. The terms "about" or "approximately," when used herein in relation to a measurement of length or angle, are intended to encompass the stated value ±5 percent or ±5 degrees. In some embodiments, central plates 90, 124 may have a center v-shape cross-sectional shape (e.g., symmetrical about a center line through the apex 112) with a first section 126 and a second section 128 being approximately equal in length to direct the airflow 34 that contacts each of the central plates 90, 124 to each side of the central plate 90, 124 in approximately equal amounts.

The sections that form the v-shape cross sections, when joined to one another, define an angle. For example, the first section 118 and the second section 120 of the off-center v-shape cross-sectional shape of the intermediate plates 90, 116 may be joined to one another to define an angle 132, and the first section 126 and the second section 128 of the center v-shape cross-sectional shape of the central plates 90, 124 may be joined to one another to define an angle 134. The angles 132, 134 may be the same or different from one another. In some embodiments, the angle 132 may be greater than the angle 134. In some embodiments, the angle 132 and/or the angle 134 may be between about 90 to 145 degrees, 105 to 135 degrees, or 115 to 125 degrees. In some embodiments, the angle 132 and/or the angle 134 may be approximately 120 degrees. It should also be appreciated that the dimensions of the first sections 118, the dimensions of the second sections 120, and/or the angle 132 may vary across different intermediate plates 90, 116. For example, one intermediate plate 90, 116 may have its first section 118 be between 5 to 45 percent of the second section 120, while another intermediate plate 90, 116 may have its first section 118 be between 50 to 95 percent of the second section 120. Similarly, the dimensions of the first sections 126, the dimensions of the second sections 128, and/or the angle 134 may vary across different central plates 90, 124.

In the illustrated embodiment, the flow-deflector assembly 44 includes two outer-most plates 90, 114, two intermediate plates 90, 116, and three central plates 90, 124. However, it should be appreciated that various other arrangements and combinations are envisioned. For example, the flow-deflector assembly 44 may include the two outer-most plates 90, 114 without the v-shape cross-sectional shape, four intermediate plates 90, 116 with the off-center v-shape cross-sectional shape, and one central plate 90 with the center v-shape cross-sectional shape. Indeed, the flow-deflector assembly 44 may include any number of outer-most plates 90, 114 without the v-shape cross-sectional shape, any number of intermediate plates 90, 116 with the off-center v-shape cross-sectional shape, and any number of intermediate plates 90, 116 with the center v-shape cross-sectional shape.

Furthermore, each plate 90 with the v-shape cross-sectional shape may have a respective width along the longitudinal axis 80 and a respective height along the vertical axis 84. The respective widths and/or the respective heights may be the same or different from one another. As shown, the respective height of each plate 90 with the v-shape cross-sectional shape (e.g., each plate 90 other than the outer-most plates 90, 114) may cause each plate 90 to extend vertically across two rows of nozzles 40. However, it should be appreciated that various arrangements of the plates 90 are envisioned. For example, any number of plates 90 (e.g., 1, 2, 3, 4, 5, 6, 7, 8, or more plates 90) may be used in the flow-deflector assembly 44. Furthermore, each plate 90 may extend vertically across only one row of nozzles 40 or across more than two rows of nozzles 40. In some embodiments, one or more plates 90 may extend vertically across a first number of nozzles 40, and one or more plates 90 may extend vertically across a second number of nozzles 40. It should be appreciated that one or more of the plates 90 may have any other suitable cross-sectional shape, such as a u-shape with a curvature, or the like. In some embodiments, one or more of the plates 90 may include through-holes or openings to enable at least some of the airflow 34 to flow through the plates 90 (e.g., in addition to flowing around the plates 90 through the gaps 96 between the plates 90).

Figure 6:
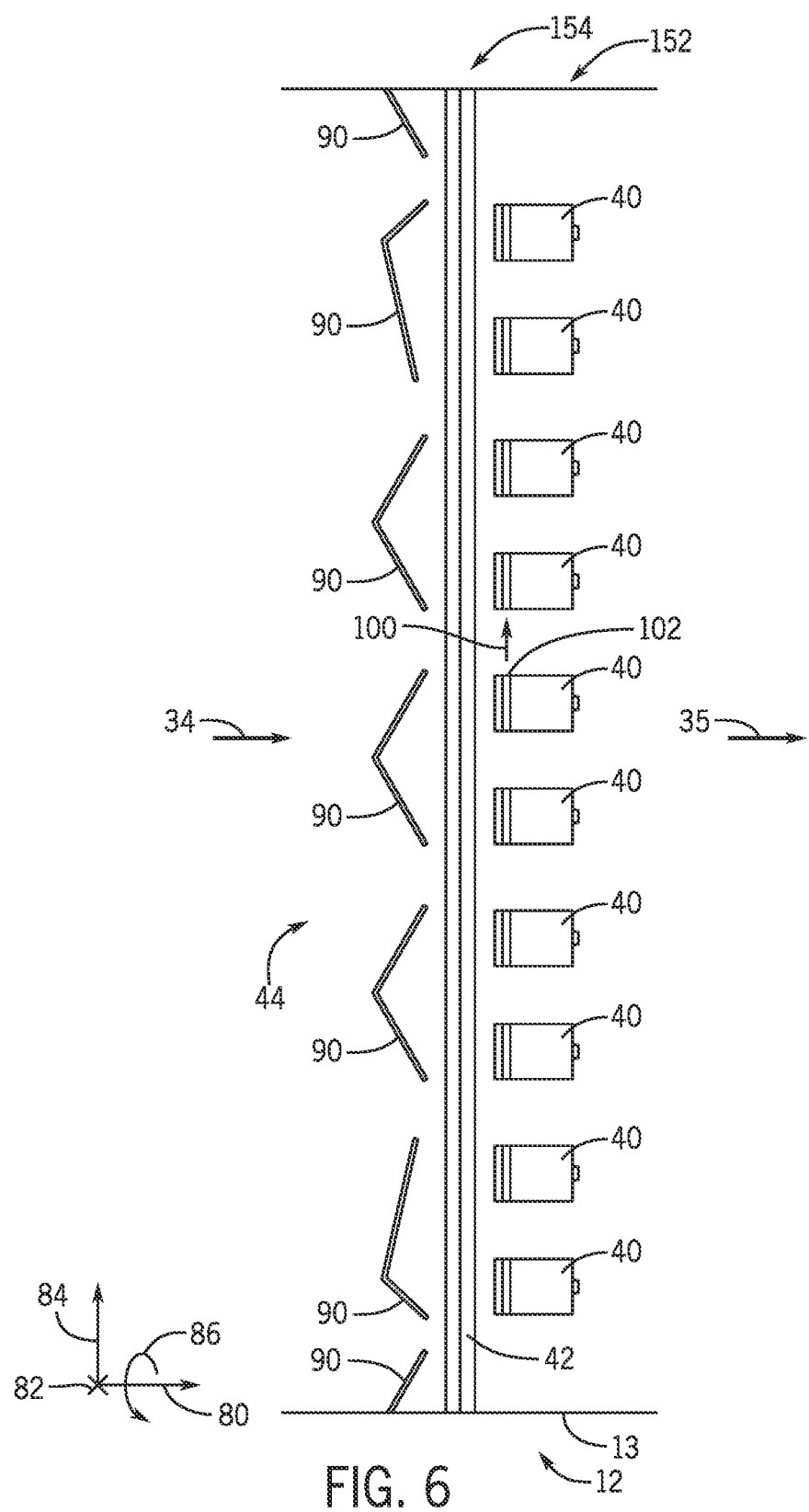
FIG. 6 is a side view of a portion of an anti-icing assembly of an anti-icing system that may be used in the air intake system of FIG. 1, wherein a manifold is positioned between a flow-deflector assembly and a nozzle along a longitudinal axis, in accordance with an embodiment.

FIG. 6 is a side view of a portion of an embodiment of an anti-icing assembly 152 that may be used in an anti-icing system 154 in the air intake conduit 13 of the air intake system 12 of FIG. 1. As discussed above, each nozzle 40 may be coupled to the manifold 42 on an upstream side of the manifold 42, such that the manifold 42 is positioned between the plates 90 and the nozzle 40 along the longitudinal axis 80. In such cases, the airflow 34 is distributed by plates 90 of the flow-deflector assembly 44 toward the nozzles 40, and the airflow 34 mixes with the heated fluid that is ejected by through the outlets 102, as shown by the arrow 100, to form the heated airflow 35 that flows toward the filter.

Advantageously, the plates of the flow-deflector assembly disclosed herein direct the airflow and the heated fluid into recirculation zones for improved mixing between the anti-icing assembly 152 and the filter 46 within the air intake system 12. The improved mixing may block the buildup of ice on the filter 46, block damage due to extremely high temperatures, and the like by providing the heated fluid within desirable temperature limits in a substantially uniform manner across the face 92 of the filter 46. The plates 90 may be positioned upstream from and adjacent to the nozzles 40, which may be positioned upstream from the manifold 42. However, other configurations are envisioned (e.g., as shown in FIG. 6).

The technical effects of the anti-icing techniques disclosed herein include providing more effective mixing of the airflow and the heated fluid within the air intake system 12. Under certain conditions (e.g., cold ambient conditions), the mixing may result in more effective removal, reduction, and/or blocking of ice buildup on the filter 46 of the air intake system 12 of the gas turbine system 10 as compared to traditional systems. The plates 90 of the flow-deflector assembly 44 of the anti-icing assembly 52 may include various mechanical features (e.g., arrangement and/or shape of the plates) to facilitate mixing of the airflow with the heated fluid to provide the more effective removal, reduction, and/or blocking of ice buildup on the filter 46 of the air intake system 12 of the gas turbine system 10. Under certain conditions (e.g., hot ambient conditions and/or IBH maximum flow), the mixing may result in more effective reduction and/or blocking of hot spots on the filter 46 of the air intake system 12 of the gas turbine system 10 as compared to traditional systems. The anti-icing assembly 52 may be cost-effective in that the components may be configured to fit within and/or interface with existing anti-icing systems and/or existing air intake systems (e.g., retrofit).

This written description uses examples to disclose the embodiments of the present disclosure, including the best mode, and also to enable any person skilled in the art to practice the embodiments of the present disclosure, including making and using any devices or systems and performing any incorporated methods. The patentable scope of the present disclosure is defined by the claims and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. An anti-icing system for a gas turbine system, the anti-icing system comprising:
a plurality of nozzles, wherein each nozzle of the plurality of nozzles comprises one or more outlets that are configured to inject a heated fluid into an airflow within an air intake conduit; and
a plurality of plates disposed upstream of the one or more outlets, wherein each plate of the plurality of plates extends laterally across the air intake conduit and is vertically spaced apart from one or more adjacent plates to define one or more vertically-extending gaps, a respective height of at least one plate of the plurality of plates causes the at least one plate of the plurality of plates to extend vertically across two vertically stacked rows of the plurality of nozzles, and the plurality of plates is configured to direct the airflow through the one or more vertically-extending gaps to spread the airflow upstream of the one or more outlets to facilitate mixing of the heated fluid and the airflow.

2. The anti-icing system of claim 1, wherein the plurality of nozzles is arranged as a two-dimensional grid.

3. The anti-icing system of claim 1, wherein the plurality of nozzles and the plurality of plates are coupled to a manifold that is configured to distribute the heated fluid to the plurality of nozzles.

4. The anti-icing system of claim 3, wherein the plurality of nozzles is positioned upstream of the manifold.

5. The anti-icing system of claim 1, wherein at least one plate of the plurality of plates comprises a v-shape cross-sectional shape.

6. The anti-icing system of claim 1, wherein a first plate of the plurality of plates comprises a first cross-sectional shape, and a second plate of the plurality of plates comprises a second cross-sectional shape that is different from the first cross-sectional shape.

7. The anti-icing system of claim 6, wherein the first cross-sectional shape is a v-shape cross-sectional shape, and the second cross-sectional shape is not a v-shape cross-sectional shape.

8. The anti-icing system of claim 6, wherein the first cross-sectional shape is an asymmetrical v-shape, and the second cross-sectional shape is a symmetrical v-shape.

9. The anti-icing system of claim 1, wherein a first plate of the plurality of plates comprises a v-shape cross-sectional shape with a first section having a first length that extends from an apex to a first end, and a second section with a second length that extends from the apex to a second end.

10. The anti-icing system of claim 9, wherein the first length is equal to the second length.

11. The anti-icing system of claim 9, wherein the first length is less than the second length.

12. The anti-icing system of claim 1, wherein an outermost plate of the plurality of plates is a tapered, linear plate that is configured to direct the airflow away from a wall of the air intake conduit.

13. The anti-icing system of claim 1, wherein an intermediate plate of the plurality of plates positioned at a first vertical location comprises an asymmetrical v-shape cross-sectional shape, a central plate of the plurality of plates positioned at a second vertical location comprises a symmetrical v-shape cross-sectional shape, and the first vertical location is further from a center line of the air intake conduit along a vertical axis as compared to the second vertical location.

14. A gas turbine system, comprising:
a turbine;
a combustor; and
a compressor coupled to an air intake system, wherein the air intake system is configured to supply a heated airflow to the compressor, the air intake system comprises a filter system and an anti-icing system, and the anti-icing system comprises:
a plurality of nozzles, wherein each nozzle of the plurality of nozzles comprises one or more outlets that are configured to inject a heated fluid into an airflow; and
a plurality of plates disposed upstream of the one or more outlets, wherein a first plate of the plurality of plates comprises a first cross-sectional shape and a second plate of the plurality of plates comprises a second cross-sectional shape that is different from the first cross-sectional shape to facilitate mixing of the heated fluid and the airflow upstream of the filter system.

15. The gas turbine system of claim 14, wherein the heated fluid comprises compressor discharge air from the compressor of the gas turbine system.

16. The gas turbine system of claim 14, wherein the first cross-sectional shape comprises an asymmetrical v-shape and the second cross-sectional shape comprises a symmetrical v-shape.

17. The gas turbine system of claim 16, wherein the first plate of the plurality of plates is positioned at a first location along a vertical axis, and the second plate of the plurality of plates is positioned at a second location along the vertical axis that is closer to a center line of the anti-icing system as compared to the first location.

18. The gas turbine system of claim 14, wherein the plurality of nozzles and the plurality of plates are coupled to a manifold that is configured to distribute the heated fluid to the plurality of nozzles, and the plurality of nozzles and the plurality of plates are positioned upstream of the manifold.

19. The gas turbine system of claim 14, wherein the plurality of nozzles are positioned upstream of the filter system and downstream of the plurality of plates.

20. A method, comprising:
injecting a heated fluid through a plurality of outlets of a plurality of nozzles into an airflow along an airflow path upstream of a filter of a gas turbine system; and
spreading the airflow upstream of the plurality of outlets via a plurality of plates positioned upstream of the plurality of outlets to facilitate mixing of the heated fluid and the airflow to thereby block ice formation on the filter of the gas turbine system, wherein spreading the airflow upstream of the plurality of outlets via the plurality of plates comprises spreading a first portion of the airflow via a first plate of the plurality of plates and a second portion of the airflow via a second plate of the plurality of plates, and the first plate and the second plate have different cross-sectional shapes.

\* \* \* \* \*